United States Patent
Ye et al.

(10) Patent No.: US 10,331,245 B2
(45) Date of Patent: Jun. 25, 2019

(54) TOUCH PANELS AND FABRICATION METHODS THEREOF

(71) Applicant: TPK Touch Solutions (Xiamen) Inc., Xiamen (CN)

(72) Inventors: Huilin Ye, Zhangzhou (CN); Zhuanyuan Zhang, Zhangzhou (CN); Qunfeng Lin, Xiamen (CN); Xiaoyan Wu, Kunshan (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 52 days.

(21) Appl. No.: 14/977,586

(22) Filed: Dec. 21, 2015

(65) Prior Publication Data
US 2016/0179237 A1 Jun. 23, 2016

(30) Foreign Application Priority Data
Dec. 23, 2014 (CN) .......................... 2014 1 0811812

(51) Int. Cl.
*G06F 3/041* (2006.01)

(52) U.S. Cl.
CPC .... *G06F 3/041* (2013.01); *G06F 2203/04103* (2013.01); *G06F 2203/04107* (2013.01)

(58) Field of Classification Search
CPC .............................................. G06F 3/041–047
See application file for complete search history.

(56) References Cited

U.S. PATENT DOCUMENTS

| | | | | |
|---|---|---|---|---|
| 2011/0147192 A1* | 6/2011 | Hsu | .......................... | G06F 3/044 200/600 |
| 2011/0234526 A1* | 9/2011 | Mi | ........................... | H05K 3/30 345/174 |
| 2011/0261550 A1* | 10/2011 | Wong | ..................... | H01L 21/561 361/818 |
| 2012/0098782 A1* | 4/2012 | Nam | ....................... | G06F 3/044 345/174 |
| 2013/0010216 A1* | 1/2013 | Kang | ..................... | G06F 3/0412 349/12 |
| 2014/0168530 A1* | 6/2014 | Lin | ...................... | G02F 1/13338 349/12 |

* cited by examiner

*Primary Examiner* — Hang Lin

(74) *Attorney, Agent, or Firm* — Cooper Legal Group, LLC

(57) ABSTRACT

A touch panel is provided. The touch panel includes a touch-sensing layer disposed on a substrate. A shielding layer is disposed on a shielding-film substrate. The shielding layer and the shielding-film substrate are disposed under the touch-sensing layer, wherein the shielding layer faces the touch-sensing layer. An adhesive layer is disposed between the touch-sensing layer and the shielding layer. An external circuit connection element has a first connection portion electrically connected with the touch-sensing layer and a second connection portion electrically connected with the shielding layer. The adhesive layer has a space and the second connection portion is disposed in the space. The space is filled with conductive glue. The conductive glue is between the second connection portion and the shielding layer. Moreover, a method for fabricating the touch panel is also provided.

3 Claims, 3 Drawing Sheets

TOUCH PANELS AND FABRICATION METHODS THEREOF

BACKGROUND OF THE INVENTION

This Application claims priority of CN Patent Application No. 201410811812.4, filed on Dec. 23, 2015, the entirety of which is incorporated by reference herein.

Technical Field

The disclosure relates to touch panel technology, and in particular to the conductive connection of a shielding layer of a touch panel.

Related Art of the Invention

In recent years, touch panels have found popular application as an input interface in various electronic products such as smartphones, tablet computers and portable personal computers. In the electronic products combined with a touch panel, there is usually a shielding layer formed between the touch panel and the electronic device, such as a display. The shielding layer can absorb electrical interference and electromagnetic noise from the electronic device, and the shielding layer is electrically connected to ground through a flexible printed circuit (FPC) to release the electrical interference and electromagnetic noise, thereby shielding the touch panel from the sort of signal interference commonly experienced by electronic devices.

In addition, the touch-sensing layer of the touch panel needs to transmit a touch-sensing signal to a processor through the FPC. The touch panels usually use the same FPC to connect to the touch-sensing layer and the shielding layer. In conventional touch panels, the FPC is electrically connected to the touch-sensing layer and the shielding layer through an anisotropic conductive film (ACF) through a thermal bonding process.

However, performing the thermal bonding process to form an electrical connection between the FPC and the shielding layer may cause damage to the shielding layer.

BRIEF SUMMARY OF THE INVENTION

In order to overcome the above problems of known touch panel technology, the disclosure provides a conductive connection design for a shielding layer of a touch panel. Using a space design of an adhesive layer combined with using conductive glue, an external circuit connection element is connected with the shielding layer. Therefore, the conductive connection of the shielding layer does not require a thermal bonding process. The problems of known touch panel technology causing damage to the shielding layer due to the thermal bonding process are thereby overcome.

According to some embodiments of the disclosure, a touch panel is provided. The touch panel includes a touch-sensing layer disposed on a substrate. A shielding layer is disposed on a shielding-film substrate. The shielding layer and the shielding-film substrate are disposed under the touch-sensing layer, and the shielding layer faces the touch-sensing layer. An adhesive layer is disposed between the touch-sensing layer and the shielding layer. An external circuit connection element has a first connection portion electrically connected with the touch-sensing layer and a second connection portion electrically connected with the shielding layer, wherein the adhesive layer has a space and the second connection portion of the external circuit connection element is disposed in the space, and the space is filled with conductive glue. The conductive glue is between the second connection portion and the shielding layer.

According to some embodiments of the disclosure, a method for fabricating a touch panel is provided. The method includes forming a touch-sensing layer on a substrate. The method also includes electrically connecting a first connection portion of an external circuit connection element to the touch-sensing layer. The method further includes a shielding layer on a shielding-film substrate. In addition, the method includes using an adhesive layer to attach the shielding layer and the shielding-film substrate to the touch-sensing layer, wherein the shielding layer faces the touch-sensing layer. The adhesive layer has a space, and a second connection portion of the external circuit connection element is disposed in the space. The method also includes filling conductive glue in the space of the adhesive layer, wherein the conductive glue electrically connects the second connection portion of the external circuit connection element to the shielding layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

Figure 1:
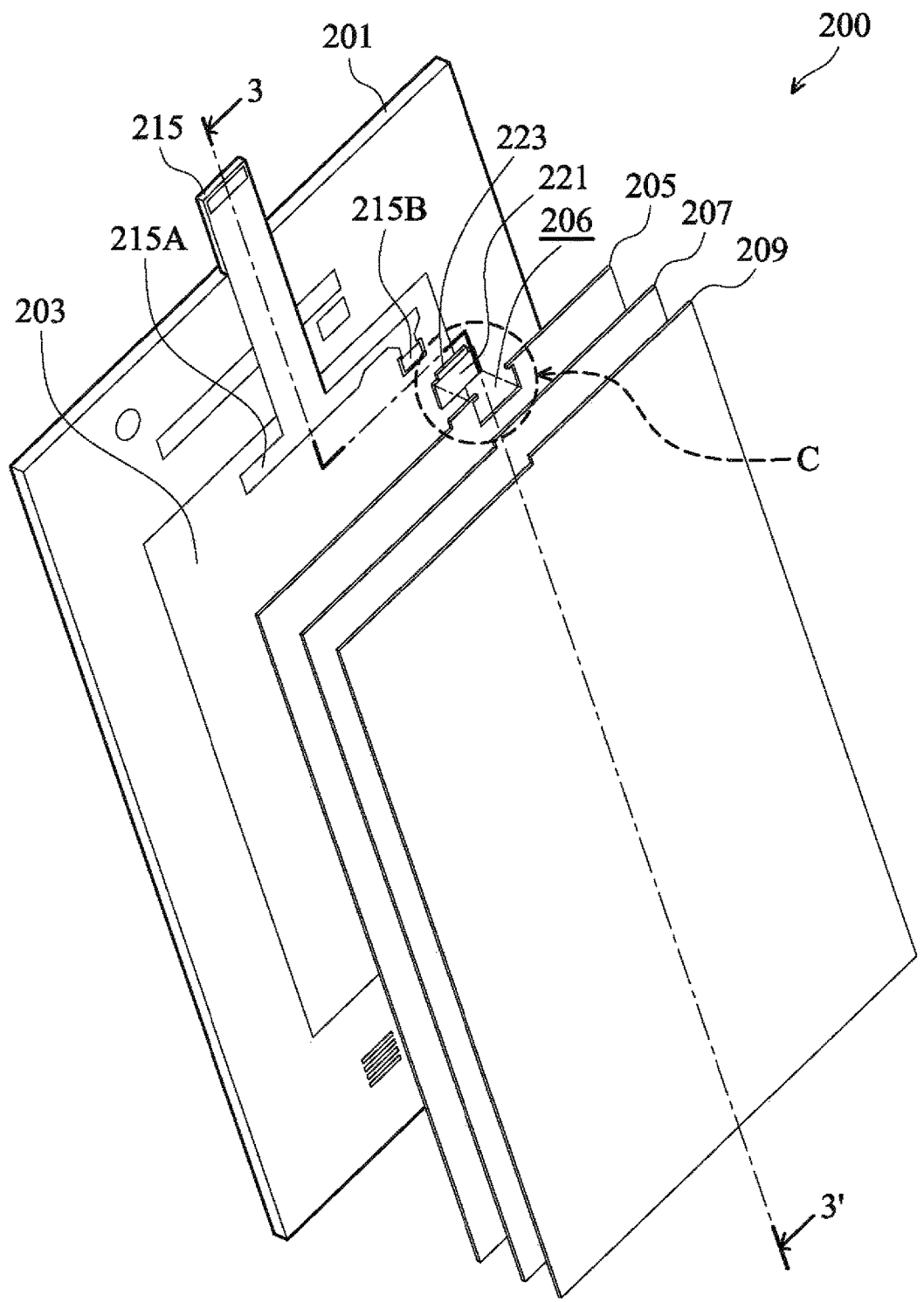
FIG. 1 shows an exploded view of a touch panel according to some embodiments of the disclosure.
Figure 2:
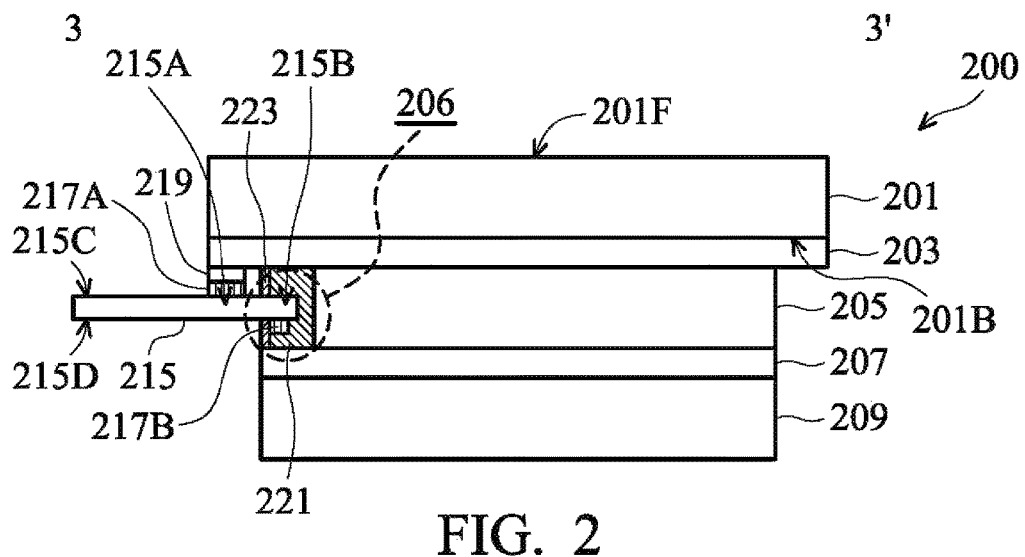
FIG. 2 shows a cross section view of a touch panel, along the line 3-3' shown in FIG. 1, according to some embodiments of the disclosure.

FIG. 1 shows an exploded view of a touch panel 200 according to some embodiments of the disclosure. FIG. 2 shows a cross section view of the touch panel 200, along the line 3-3' shown in FIG. 1, according to some embodiments of the disclosure. Referring to FIGS. 1-2, in some embodiments, the touch panel 200 can be a touch panel fabricated by using a single substrate. A touch-sensing layer 203 is formed on an inner surface 201B of a substrate 201, and an outer surface 201F of the substrate 201 is used as a touch surface of the touch panel 200. The substrate 201, for example, is a glass substrate. The touch-sensing layer 203 can be formed by using any touch panel technique. Therefore, the touch panel 200 of the disclosure can be one of many different types of touch panels, such as capacitive, resistive, or inductive. In addition, the touch panel 200 of the embodiments of the disclosure is not limited to the touch panel structure fabricated by using a single substrate. The touch panels of the disclosure in some embodiments can also be a touch panel structure including two or more substrates.

A shielding layer 207 of the touch panel 200 is formed on a shielding-film substrate 209 to constitute a shielding structure. The shielding layer 207 can be a planar structure formed of a transparent conductive material such as indium tin oxide (ITO) or a mesh structure formed of metal material. The material of the shielding-film substrate 209 is a polymer that is light-penetrating such as polyethylene terephthalate (PET). The shielding structure is attached to the touch-sensing layer 203 through an adhesive layer 205. The material of the adhesive layer 205 can be an optical clear adhesive (OCA). In the configuration of FIGS. 1-2, the shielding structure is made by applying a forward-direction design. Namely, the shielding layer 207 is disposed facing the touch-sensing layer 203 and formed on the side of the shielding-film substrate 209 that is close to the touch-sensing layer 203, and the adhesive layer 205 is located between the touch-sensing layer 203 and the shielding layer 207.

An external circuit connection portion 215, for example a flexible printed circuit (FPC), includes a first connection portion 215A for electrically connecting with the touch-sensing layer 203 and a second connection portion 215B for electrically connecting with the shielding layer 207. The first connection portion 215A has first bonding pads 217A formed on one surface of the external circuit connection element 215. The second connection portion 215B has second bonding pads 217B formed on another surface of the external circuit connection element 215. The first bonding pads 217A and the second bonding pads 217B are respectively formed on two opposite surfaces 215C, 2015D of the external circuit connection element 215.

According to some embodiments of the disclosure, the adhesive layer 205 has a space 206, and the second connection portion 215B of the external circuit connection element 215 is disposed in the space 206. The space 206 in the adhesive layer 205 is designed so that the external circuit connection element 215 can be first attached on to the touch-sensing layer 203, and then the shielding structure constituted of the shielding layer 207 and the shielding-film substrate 209 is attached to the touch-sensing layer 203 using the adhesive layer 205. After the attaching step, the second connection portion 215B of the external circuit connection element 215 is located in the space 206.

According to some embodiments of the disclosure, the space 206 of the adhesive layer 205 is filled with conductive glue 221 by injection with a needle. The material of the conductive glue is liquid conductive glue, for example, a silver paste. The conductive glue filling in the space 206 surrounds the second connection portion 215B and the second bonding pads 217B of the external circuit connection element 215. In addition, the conductive glue 221 is located between the shielding layer 207 and the second bonding pads 217B of the second connection portion 215B of the external circuit connection element 215. As a result, the external circuit connection element 215 can be electrically connected with the shielding layer 207 through the conductive glue 221. Accordingly, through the design of the space 206 in the adhesive layer 205 combined with using the conductive glue 221, the embodiments of the disclosure do not require the use of a thermal bonding process. This can prevent the shielding layer 207 and the shielding-film substrate 209 from damage.

The first bonding pads 217A on the first connection portion 215A of the external circuit connection element 215 can be connected with contacting pads (not shown) of the touch-sensing layer 203 through an anisotropic conductive film (ACF) by a thermal bonding process. Since the substrate 201 can be a glass substrate, the glass substrate has a better capability to withstand the pressure and the temperature of the thermal bonding process than that of the shielding-film substrate 209. Therefore, the connection between the external circuit connection element 215 and the touch-sensing layer 203 can be performed by using the thermal bonding process without adverse effects.

In some embodiments of the disclosure, after the conductive glue 221 is filled in the inside of the space 206 of the adhesive layer 205, a protective film 223 can be applied to the space 206 by injection with a needle. As shown in FIG. 2, the protective film 223 is located at the outer side of the space 206, so that the conductive glue 221 is located between the protective film 223 and the adhesive layer 205. Through the disposition of the protective film 223, the conductive glue 221 in the space 206 can be sealed, and the second connection portion 215B of the external circuit connection element 215 and the second bonding pads 217B on the second connection portion 215B are surrounded by the protective film 223 and the conductive glue 221. The material of the protective film 223 is a type of liquid insulating glue, such as an optical clear adhesive (OCA). The protective film 223 can isolate external air and moisture from contact with the conductive glue 221, and prevent the conductive glue 221 from corroding or oxidizing. The reliability of the conductive connection between the shielding layer 207 and the external circuit connection element 215 is thereby improved.

Figure 3:
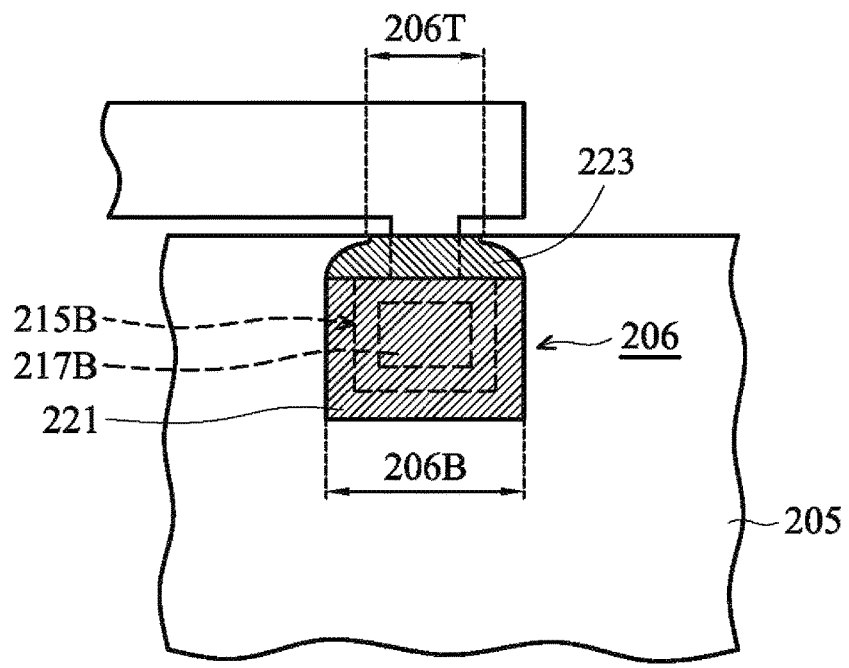
FIG. 3 shows a partial plane view of a touch, panel of the area C in FIG. 1 according to some embodiments of the disclosure.

FIG. 3 is a partial plane view of the touch panel 200 in the area C of FIG. 1 according to some embodiments of the disclosure. As shown in FIG. 3, the adhesive layer 205 has the space 206. In some embodiments, the space 206 can be a U-shaped space which has a wide inside and a narrow outside. The opening of the space 206 has an opening width 206T and the bottom of the space 206 has a bottom width 206B. The opening width 206T is smaller than the bottom width 206B. According to some embodiments of the disclosure, the bottom width 206B of the space 206 is wider than the opening width 206T of the space 206, which can enhance the conductivity of the conductive glue 221 to the electrical connection between the shielding layer 207 and the second bonding pads 217B on the second connection portion 215B of the external circuit connection element 215. According to some embodiments of the disclosure, the opening width 206T of the space 206 is narrower than the bottom width 206B of the space 206, so that the area of the conductive glue 221 in contact with external air and moisture is reduced. Moreover, any overflow of the liquid conductive glue can be effectively suppressed by the narrow opening width 206T before the liquid conductive glue is cured.

In some embodiments, the conductive glue 221 can completely fill the space 206 of the adhesive layer 205. In some other embodiments, the conductive glue 221 can fill a portion of the space 206, but the conductive glue 221 still completely covers the second bonding pads 217B on the second connection portion 215B of the external circuit connection element 215. Therefore, the reliability of the electrical connection between the second bonding pads 217B of the external circuit connection element 215 and the shielding layer 207 can be assured.

In addition, as shown in FIG. 3, in some embodiments, the conductive glue 221 only fills the bottom of the space 206, and the opening of the space 206 is not filled with the conductive glue 221. In this case, the protective film 223 can be applied to fill the opening of the space 206. As a result, the conductive glue 221 is located between the protective film 223 and the adhesive layer 205 to isolate the conductive glue 221 from contact with external air and moisture and protect the conductive glue 221 from corrosion or oxidation. Therefore, the reliability of the electrical connection between the shielding layer 207 and the external circuit connection element 215 through the conductive glue 221 can be better assured. In some embodiments, the second connection portion 215B of the external circuit connection element 215 and the second bonding pads 217B on the second connection portion 215B are surrounded by the protective film 223 and the conductive glue 221.

Figure 4:
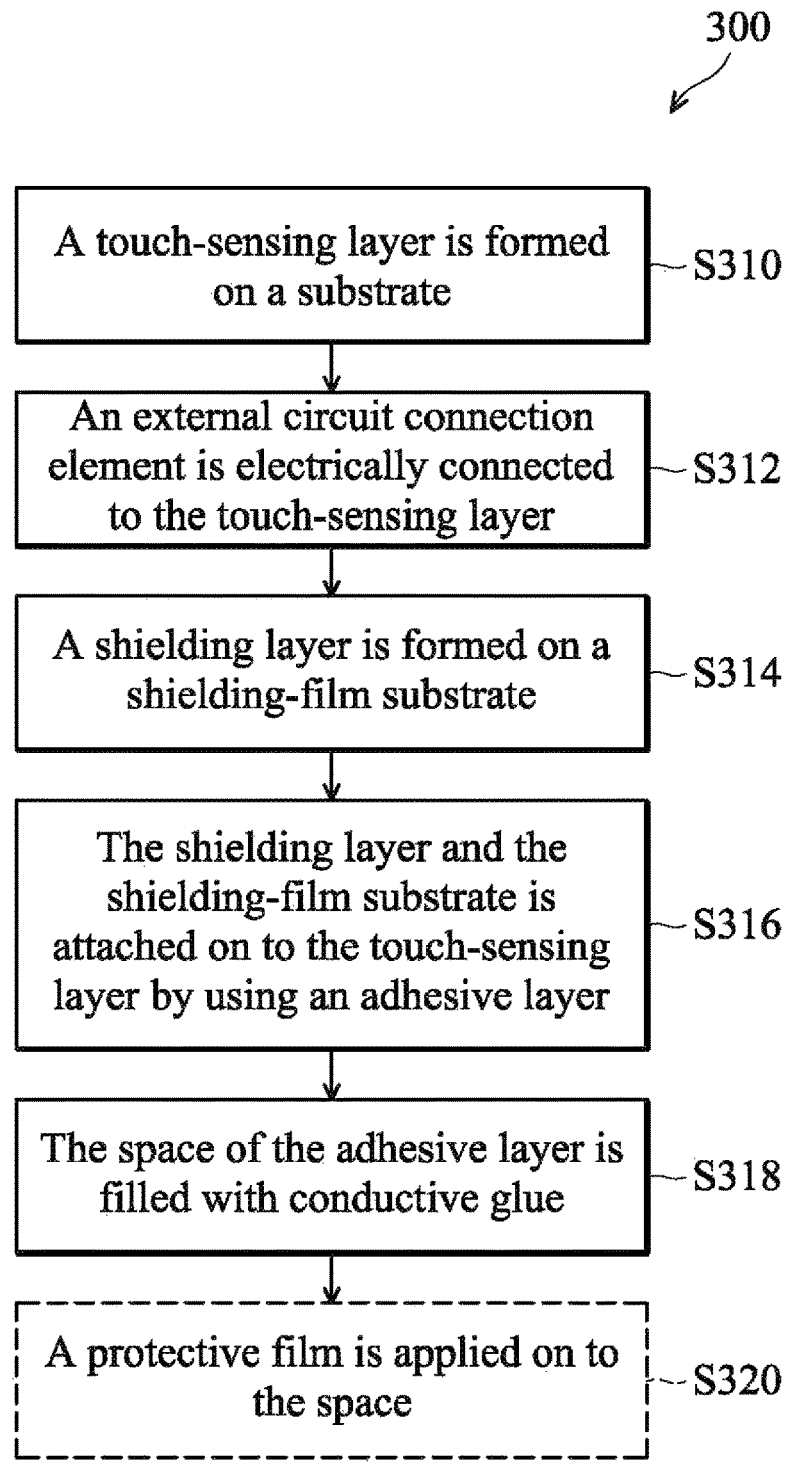
FIG. 4 shows a flow chart of a method of fabricating a touch panel according to some embodiments of the disclosure.

FIG. 4 shows a flow chart of a fabrication method 300 of the touch panel 200 according to some embodiments of the disclosure. The following description of steps can be illustrated with reference made to the structures of the touch panel 200 shown in FIG. 1 and FIG. 2, but is not limited to any particular structure. In step S310, the touch-sensing layer 203 is formed on the inner surface 201B of the substrate 201 of the touch panel 200. The touch-sensing layer 203 can be made by any touch panel technology to form touch panels of various touch types.

In step S312, the external circuit connection element 215 is electrically connected to the touch-sensing layer 203. In some embodiments, the first bonding pads 217A on the first connection portion 215A of the external circuit connection element 215 are bonded with the contacting pads of the touch-sensing layer 203 through the anisotropic conductive film (ACF) 219 by the thermal bonding process.

In step S314, the shielding layer 207 is formed on the shielding-film substrate 209 to constitute the shielding structure. In some embodiments, the shielding layer 207 can be a planar structure made of a transparent conductive material. In other embodiments, the shielding layer 207 can be a mesh structure made of a metal material.

In step S316, the shielding structure constituted of the shielding layer 207 and the shielding-film substrate 209 is attached on to the touch-sensing layer 203 by using the adhesive layer 205. The shielding layer 207 is disposed facing the touch-sensing layer 203 and located on one side of the shielding-film substrate 209 that is close to the touch-sensing layer 203. In addition, an area of the adhesive layer 205 corresponding to the second connection portion 215B of the external circuit connection element 215 is designed with the space 206. After the attaching step, the second connection portion 215B of the external circuit connection element 215 is disposed in the space 206 of the adhesive layer 205.

In step S318, the space 206 of the adhesive layer 205 is filled with the conductive glue 221 by injection with a needle. According to some embodiments of the disclosure, the conductive glue 221 filling in the space 206 can electrically connect the second bonding pads 217B on the second connection portion 215B of the external circuit connection element 215 with the shielding layer 207.

In addition, step S320 can be selectively performed in the fabrication method 300 of the touch panel 200. In step S320, the protective film 223 is applied on to the space 206 by injection with a needle so that the conductive glue 221 in the space 206 is sealed by the protective film 223. The protective film 223 can isolate the conductive glue 221 from external air and moisture.

In known technology, the electrical connection of the shielding layer of the touch panel is designed in such a way that requires first connecting the external circuit connection element with the shielding layer, and then attaching the shielding layer to the touch-sensing layer. Since the connection area between the external circuit connection element and the shielding layer is much smaller than the connection area between the external circuit connection element and the touch-sensing layer, the adhesion between the external circuit connection element and the shielding layer is weaker. Specifically, when the external circuit connection element does not have support, the external circuit connection element can easily become separated from the shielding layer during the processes of fabricating the touch panel. In addition, the external circuit connection element has only a small area to connect with the shielding layer, which also affects the operation of attaching the shielding layer to the touch-sensing layer in the process of fabrication using known technology.

According to the fabrication method of the embodiments of the disclosure, the external circuit connection element is first attached to the touch-sensing layer for electrically connecting the first connection portion of the external circuit connection element with the touch-sensing layer. Then, the shielding structure constituted of the shielding layer and the shielding-film substrate is attached to the touch-sensing layer by using the adhesive layer with the design of the space. Namely, it does not need to first connect the external circuit connection element with the shielding layer. Accordingly, the steps of the process of the embodiments of the disclosure can overcome the problems described above, which are caused from first connecting the external circuit connection element with the shielding layer. According to the embodiments, the second connection portion of the external circuit connection element is not separated from the shielding layer, and the practicability of fabricating the touch panels is thereby enhanced.

In addition, according to the embodiments of the disclosure, the external circuit connection element is electrically connected with the shielding layer through the conductive glue. The shielding layer and the shielding-film substrate are not processed by the thermal bonding process. Therefore, the shielding layer and the shielding-film substrate of the touch panel do not have problems with cracks or a poor appearance. The reliability of the shielding layer and the shielding-film substrate of the touch panel is thereby enhanced.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). For example, the conductive connection of the shielding layer in the embodiments of the disclosure can not only be applied to the electrical connection between the shielding layer and the flexible printed circuit, but it can also be applied to the electrical connection between the shielding layer and other external circuit connection elements. Therefore, the scope of the appended claims should be accorded the broadest interpretation so as to encompass all such modifications and similar arrangements.

What is claimed is:

1. A touch panel, comprising:
 a touch-sensing layer disposed on a substrate;
 a shielding layer disposed on a shielding-film substrate, wherein:
  the shielding layer and the shielding-film substrate are disposed under the touch-sensing layer, and
  the shielding layer faces the touch-sensing layer;
 an adhesive layer disposed between the touch-sensing layer and the shielding layer;
 an external circuit connection element having a first connection portion electrically connected with the touch-sensing layer and a second connection portion electrically connected with the shielding layer, wherein:
  the external circuit connection element is disposed between the touch-sensing layer and the shielding layer,
  the adhesive layer has a space, the space has an opening,
the second connection portion of the external circuit connection element is disposed in the space through the opening, and
the space is filled with conductive glue; and
a protective film located at an outer region of the space, wherein:
the conductive glue is between the protective film and the adhesive layer,
the protective film covers the opening of the space to seal the conductive glue in the space,
the second connection portion of the external circuit connection element is surrounded and covered by the protective film and the conductive glue, and
the first connection portion of the external circuit connection element is disposed on a first side of the protective film and the second connection portion of the external circuit connection element is disposed on a second side of the protective film opposite the first side of the protective film.

2. The touch panel of claim 1, wherein the protective film and a portion of the conductive glue adjacent to the protective film are in contact with a bottom surface of the touch-sensing layer and a top surface of the external circuit connection element.

3. The touch panel of claim 1, wherein the first connection portion of the external circuit connection element and the second connection portion of the external circuit connection element are disposed between the touch-sensing layer and the shielding layer.

* * * * *